United States Patent [19]

Yochum et al.

[11] 4,429,219

[45] Jan. 31, 1984

[54] APPARATUS FOR DETERMINING AND INDICATING THE POSITION OF A MOVABLE MEMBER

[75] Inventors: Billy G. Yochum; G. James Keller, both of Quincy, Ill.

[73] Assignee: Harris Corporation, Melbourne, Fla.

[21] Appl. No.: 252,840

[22] Filed: Apr. 10, 1981

[51] Int. Cl.³ .............................................. G01D 5/34
[52] U.S. Cl. ................................ 250/229; 250/237 G; 356/395
[58] Field of Search ............. 250/231 SE, 237 G, 229; 340/347 P, 365 P; 356/395; 325/453

[56] References Cited

U.S. PATENT DOCUMENTS

| | | | |
|---|---|---|---|
| 3,381,288 | 4/1968 | Van Vlodrup | 340/347 P |
| 3,619,626 | 11/1971 | Rudolph | 356/160 |
| 3,835,384 | 9/1974 | Liff | 325/453 |
| 4,015,253 | 3/1977 | Goldstein | 340/347 P |
| 4,100,420 | 7/1978 | Metcalf et al. | 250/231 SE |
| 4,122,395 | 10/1978 | Schotz et al. | 325/453 |
| 4,137,451 | 1/1979 | Einolf | 250/231 SE |
| 4,158,509 | 6/1979 | Rieder et al. | 250/237 G |

Primary Examiner—David C. Nelms
Attorney, Agent, or Firm—Yount & Tarolli

[57] ABSTRACT

Apparatus for detecting the position of a movable member such as the control lever (42) of an audio fader (FIG. 2). A series of light emitting and detecting elements (Q1–Q5) define a plurality of light paths arranged over a distance of D units, and provide a first output indicating which of the light paths are blocked. A shutter (24) includes light-obscuring regions (53, 54, 56) alternating with nonlight-obscuring regions where both the light-obscuring and nonlight-obscuring regions are D units in length. The shutter travels through the light paths so as to affect the output of the light detecting elements. The shutter is coupled to the control lever so that the position of the shutter is dependent upon, and therefore indicates, the position of the movable member. Other elements (Q11–Q13 and the solid upper portion of the shutter) provide a second output indicating which ones of the light-obscuring or nonlight-obscuring regions of the shutter are interposed in the light paths, whereby the first and second outputs together indicate the position of the movable member. Other light emitting and detecting elements (Q6–Q10) are provided to extend the range of operation of the apparatus.

11 Claims, 7 Drawing Figures

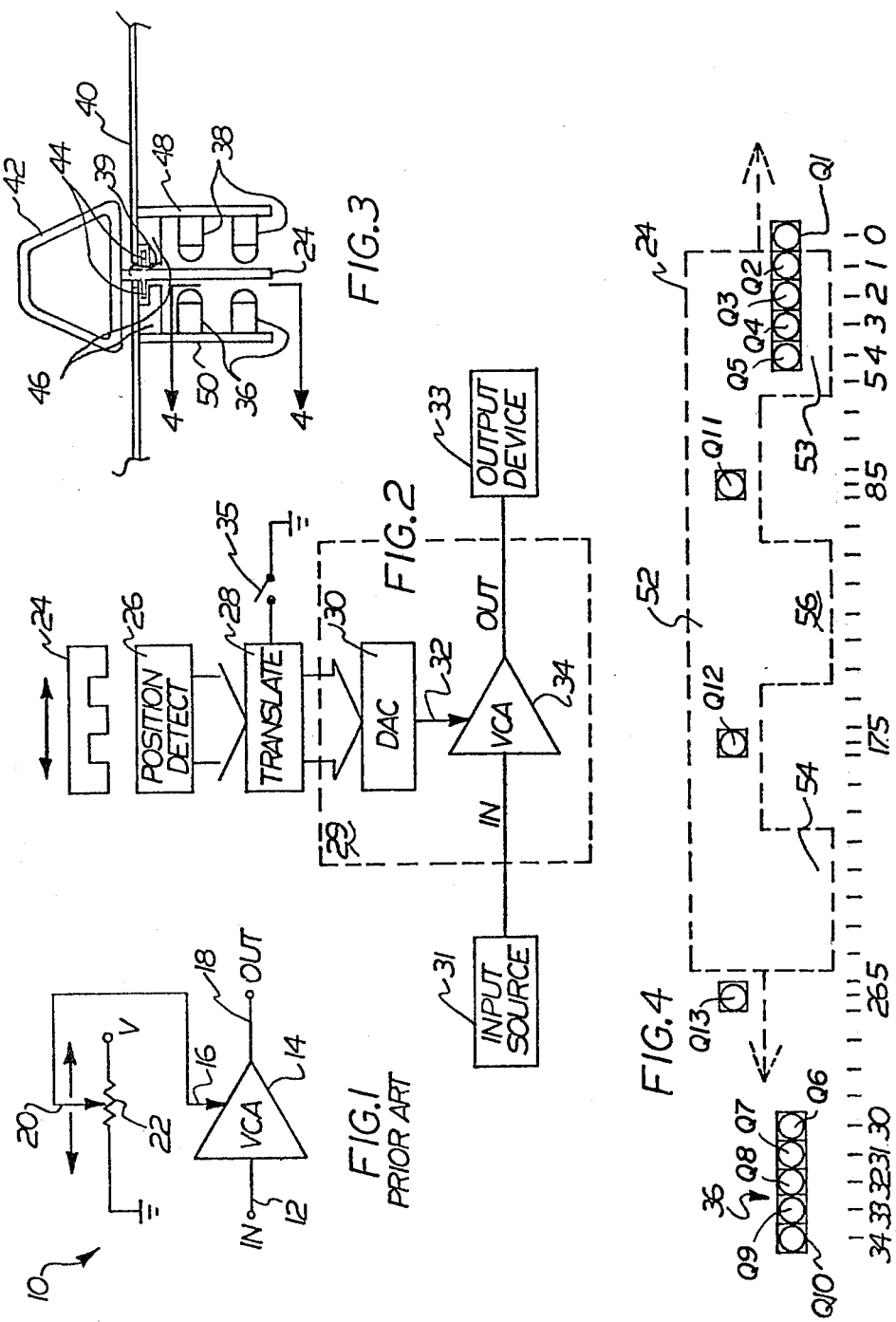

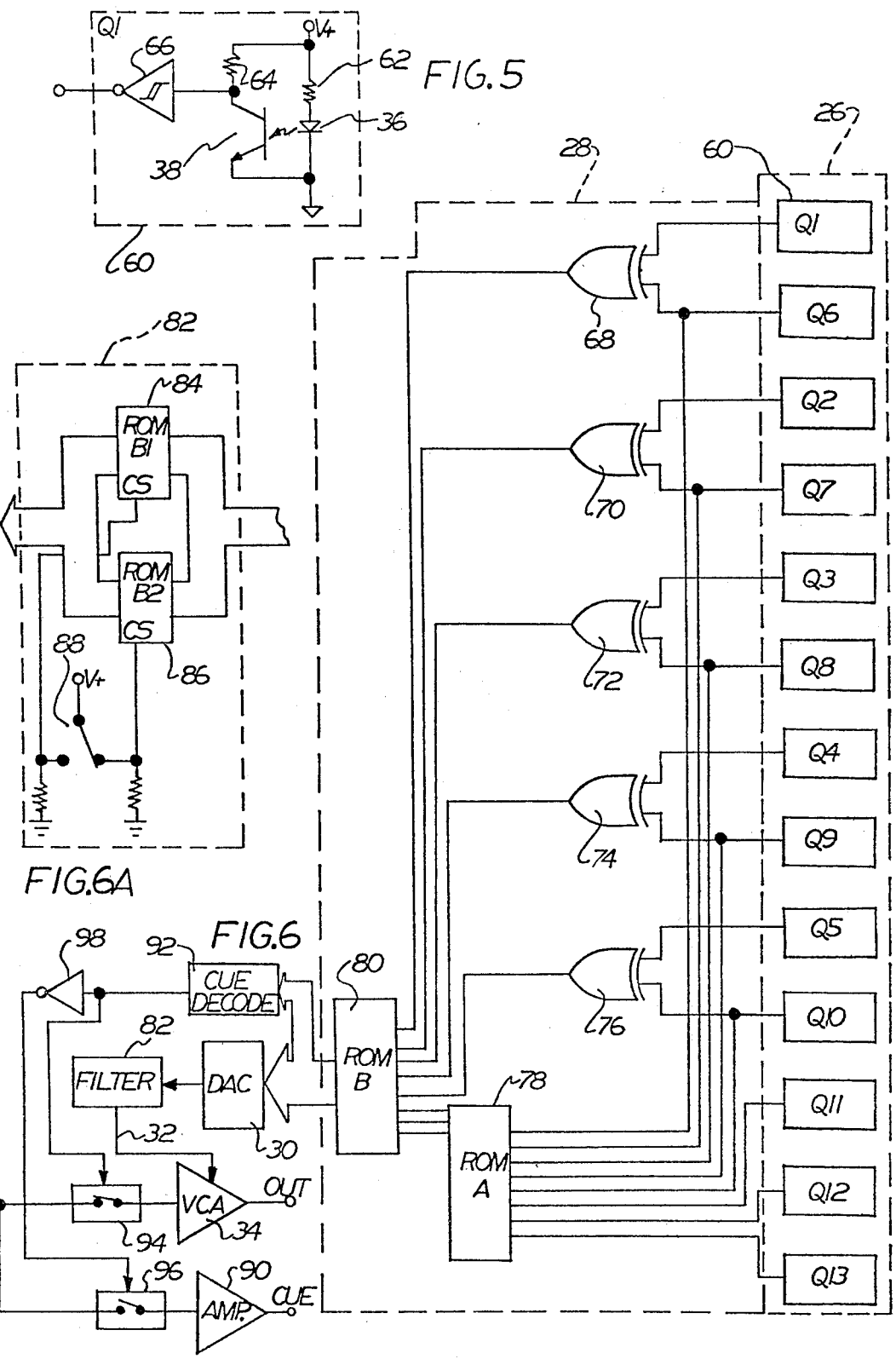

APPARATUS FOR DETERMINING AND INDICATING THE POSITION OF A MOVABLE MEMBER

CROSS REFERENCE TO RELATED APPLICATION

The subject matter herein is related to that described in the co-pending, commonly assigned patent application of Yockum, U.S. Patent application Ser. No. 242,019, filed in March, 1981, entitled "Apparatus for Controlling an Operational Characteristic of a Controlled Device in Accordance with the Position of a Movable Member".

BACKGROUND AND FIELD OF THE INVENTION

The present invention relates to apparatus for determining and indicating the position of a movable member, such as a manually adjustable control lever. More particularly, there is disclosed herein apparatus for using radiant energy to detect the position of the movable member.

In the past, it has been common to control the operational characteristics of a controlled device in accordance with the position of a movable member by connecting the movable member to either a linear or rotary potentiometer, whereby movement of the movable member changed the setting of the potentiometer. The signal derived from the wiper arm of the potentiometer was then applied to the controlled device for controlling the operational characteristic of interest. One example of such an application is the fader control commonly employed in audio consoles. In the past, these fader controls have consisted of a linear potentiometer whose settling was controlled by the operator. The voltage signal derived at the wiper arm of the potentiometer was applied to a voltage controlled amplifier (VCA) for controlling its gain.

Potentiometers, however, tend to wear with time, eventually becoming so electrically "noisy", that replacement is required. Further, there is a period of gradual deterioration between the time of first use and the time that replacement is mandated. It would be desirable to provide some manner of controlling the operational characteristic of the controlled device which avoided this operational degradation with time, preferably maintaining quiet operation indefinitely.

Devices have been developed which utilize radiant energy to determine the position of a movable member in order to avoid the mechanical contact inherent in potentiometers and the like. Such devices are described in U.S. Pat. Nos. 3,363,106; 4,100,420; 3,835,384 and others.

SUMMARY OF THE INVENTION

It is a general object of the present invention to provide improved apparatus for determining and indicating the position of the movable member.

It is another object of the present invention to provide improved position determining apparatus where the operation of the apparatus does not deteriorate with time.

It is still another object of the present invention to provide such apparatus which is characterized by quiet operation both initially and after extended operation.

It is yet another object of the present invention to provide apparatus for determining the position of the movable member by utilizing a shutter/light path arrangement having relatively compact size and small number of light paths, yet permitting resolution of positions over a wide positional range.

It is a more limited object of the present invention to provide such apparatus for use in a fader control for controlling the gain of an audio signal.

In accordance with the present invention, apparatus is provided for determining the position of a movable member. The apparatus includes first means defining a plurality of substantially parallel light paths arranged over a distance of D units and providing a first output indicating which of said light paths are blocked. First shutter means is also provided having alternate light-obscuring and nonlight-obscuring regions, each substantially D units in length, where the first shutter means is movable through said parallel light paths so as to effect the output of said first means and is adapted to be coupled for movement with said movable member whereby the position of said first shutter means is dependent upon the position of said movable member. Second means is provided for determining which ones of said light obscuring or nonlight obscuring regions are interposed in said light paths and are thus affecting said first output. The first and second outputs therefore together indicate the position of said shutter means and thus of the movable member.

BRIEF DESCRIPTION OF THE DRAWINGS

The foregoing and other objects and advantages of the present invention will become more readily apparent from the following detailed description, as taken in conjunction with the accompanying drawings, wherein:

FIG. 1 is a schematic of a prior art fader control;

FIG. 2 is a broad block diagram of an improved fader control wherein radiant energy is used to detect the position of the movable member;

FIG. 3 is a front elevation view of a fader control in accordance with the teachings of the present invention, illustrating the relative orientations of the shutter and the optical elements used to detect the location of the movable lever;

FIG. 4 is a side elevation view of a portion of the fader control of FIG. 3, showing the relative positions of the optical elements utilized to detect the position of the shutter;

FIG. 5 is a schematic representation of one embodiment of electrical circuitry associated with the optical position sensing elements; and FIGS. 6 and 6A are schematics of a circuit for translating the optical element outputs into positional value signals.

DETAILED DESCRIPTION

As used herein and the claims which follow, the term "light" is intended to encompass not only visible wavelengths of electromagnetic energy, but also infrared and ultraviolet wavelengths.

A prior art audio fader is schematically represented in FIG. 1. In this form of prior art audio fader, the audio signal is supplied to an input 12 of a voltage controlled amplifier 14. The voltage controlled amplifier 14 amplifies the audio signal to an extent which varies in accordance with the voltage applied to a gain control input 16 thereof, and provides the resulting amplified audio signal on an output 18. The control signal applied to the control input 16 of the voltage controlled amplifier 14 is derived from the wiper arm 20 of a potentiometer 22. The potentiometer 22, which is generally a linear potentiometer, is connected across a voltage supply having a magnitude representing the range over which it is desired to vary the control signal applied to the control input 16 of the voltage controlled amplifier.

Conventionally, the potentiometer 22 will have its wiper arm 20 directly coupled to a fader control lever. In order to vary the gain of the audio signal, the operator will manually adjust the position of the slider or other member coupled to the wiper arm 20 of the potentiometer 22, thereby adjusting the gain control voltage applied to the gain control input of the voltage controlled amplifier 14.

The sliding contact between the wiper arm 20 and the potentiometer 22 introduces noise into the gain control signal provided at the wiper arm 20. Furthermore, as the potentiometer wears, the level of noise introduced thereby will gradually increase. The noise produced by the potentiometer 22 will be multiplicatively combined with the audio signal by the voltage controlled amplifier 14. Consequently, the gain control operation introduces a noise component into the audio signal.

In accordance with the teachings of the present invention, a fader control is described embodying an improved technique for sensing the location of the fader control lever. In the fader control which will now be described, the position of the movable member is optically sensed through use of a shutter/light path arrangement and the optically detected position indication is translated into an indication representative of the value associated with the position thus detected. The gain of the audio signal is then adjusted in accordance with the value indication thus provided. Since the location of the movable member is optically sensed, the noise problems introduced by mechanical sliding electrical contacts are avoided. Since value/position translation is performed separately of position detection, the translation circuit may be designed so as to be readily changed without changing the position detection circuit. The novel shutter/light path arrangement of the present invention permits relatively high resolution over a wider positional range while minimizing the size of the shutter and the number of light paths required to sense shutter position.

An overall block diagram of a system in which the present invention may conveniently find use is illustrated in FIG. 2. The manually movable member is coupled, either directly or through a suitable gearing arrangment, to a shutter 24 such that movement of the shutter is effected by movement of the movable member. The position of the shutter therefore indicates the position of the movable member to which it is coupled. The position of the shutter is optically detected by a position detecting circuit 26. The position detector 26 includes optical emitter and detector elements which are disposed along the path of movement of the shutter 24. When the shutter 24 is moved to different positions, different combinations of the light paths between the optical detectors and emitters will be blocked. The outputs of the various optical detectors is therefore representative of the position of the shutter 24.

The electrical signals provided at the outputs of the various optical detectors are provided to a translation circuit 28 which converts the signals thus provided into electrical signals representative of the value associated with the shutter position indicated by the outputs of the position detector. These value-indicating signals are provided to a controlled device 29 for use in controlling an operational characteristic of the device.

In FIG. 2 the controlled device is a digitally controlled amplifier which amplifies an audio signal provided by an audio source 31 to provide an amplified audio signal to an output device 33, such as a radio transmitter, tape recorder, speaker, etc. A digital-to-analog converter 30 is included for converting the digital signal provided by the translator circuit 28 into an analog signal. The analog signal generated by convertor 30 is provided at an output 32 which is connected to the gain control input of a voltage controlled amplifier 34. The gain of the voltage controlled amplifier (VCA) is therefore directly controlled by the output of the digital-to-analog converter 30. The VCA 34 responds to the audio signal provided by source 31 and provides the resulting amplified signal to the output device 33.

Through the arrangement of FIG. 2, the gain of the voltage controlled amplifier 34 will depend upon the position of the shutter 24. The actual relationship between the gain of the voltage controlled amplifier 34 and the position of the movable shutter 24 will be set by the translation circuit 28 since it is this circuit which translates the output of the position detector 26 into particular gain values. In one embodiment the translation circuit 28 may be configured to provide digital output signals whose binary values linearly change with position of the shutter 24. In this event, the gain of voltage controlled amplifier 34 will be linearly related to the position of the shutter 24. Presuming that the manually movable slider is directly connected to the shutter 24, the relationship between the position of the manually movable member and the gain of the voltage control amplifier will therefore similarly be linear. This relationship may be readily changed by simply substituting a different translation circuit, reflecting the substitution of different values for the respective locations of the movable shutter 24. A translation circuit 28 may be utilized, for example, which provides a logarithmic relationship between the position of the movable shutter 24 and the gain of the voltage control amplifier 34, thereby providing an "audio taper" fader.

The translation circuit 28 may be designed to selectably provide several sets of values, with the particular set being used at a given time being selectable by the operator, as by a switch 35. A particular amplifier gain versus shutter position relationship could then be easily selected by merely setting the switch 35 into the appropriate position.

The optical position detector of FIG. 2 does not rely on mechanical contact between elements thereof for establishing the position detection operation. Instead, a shutter and light beam operation is employed which is essentially immune to the wear problems associated with the prior art approach of FIG. 1. Furthermore, the bulk of the signal processing may be accomplished with digital circuitry, permitting low noise operation.

A preferred embodiment of an optical displacement transducer in accordance with the present invention is illustrated in FIGS. 3 and 4, which are respectively front and side elevation views of the detector showing the preferred configuration of the optical shutter 24 and the associated optical elements. As can best be seen in FIG. 3, the various light emitters 36 and detectors 38 are disposed on opposite sides of the shutter 24, in horizontal and vertical alignment with one another whereby each detector 38 is disposed in the path of the beam produced by its associated emitter 36. The output state of each detector 38 is therefore dependent upon whether the shutter 24 is blocking the light path between that detector and its associated emitter. Preferably, the light emitters will be infrared light emitting diodes, and the detectors 38 will be selected to have infrared sensitivity characteristics matching the emission characteristics of the emitters. The use of emitters and detectors which operate on the infrared frequency range reduces the susceptibility of the position detector to false outputs caused by ordinary room illumination leaking into the detectors. Of course, any other suitable radiant energy emitters and detectors could alternatively be employed.

The shutter 24 will be designed to travel in a path skewed (preferably perpendicular) to the optical lines joining the various emitters 36 and associated detectors 38. The shutter 24 includes a tab 39 which projects through a slot in the panel 40 to which the shutter and position detector assembly are fastened. A knob 42 is mounted on the tab so as to permit the operator to slide the shutter back and forth along the slot within which the tab rides. The shutter 24 also has two ridges 44 protruding from the opposite sides thereof. These ridges 44 are captured in corresponding slots in two parallel rails 46 fastened to the panel 40 adjacent the longitudinal slot within which the shutter 24 rides. These rails 46 cooperate with the projecting ridges 44 to confine and guide the shutter 24. The shutter 24 will, of course, be constructed of a material which is opaque at the light frequencies emitted by the emitters 36.

Printed circuit board assemblies 48 and 50 are affixed to the rails 46, and respectively carry the detectors 38 and emitters 36. The emitter/detector pairs are carried in two parallel levels. The arrangement of the emitter/detector pairs along the path of travel of the shutter 24 is different in these two levels, as is the configuration of the shutter. The actual arrangement of emitters and configuration of the shutter 24 can best be seen in FIG. 4.

For clarity, the optical shutter 24 is shown in dotted lines in FIG. 4. The shutter 24 has a comb-like appearance, having a solid backbone 52 aligned with the upper row of emitter/detector pairs, and three downward projecting teeth 54 which protrude into the optical paths of the emitter/detector pairs in the lower row. The two end teeth 54 and 58 each have one edge aligned with the corresponding edge of the backbone 52. The central tooth is spaced midway between the two end teeth 54 and 58. The three teeth have widths which are essentially equal, and are the same as the width of the gaps separating the teeth.

The lower row of emitter elements consists of ten emitters, arranged in two groups of five. The five emitters of each group are disposed immediately adjacent one another, and the two groups are separated by a distance corresponding to the total width of the shutter 24. Consequently, the shutter 24 may be disposed in an intermediate position wherein it will not block the light paths associated with any of the emitter/detector pairs in the lower level, but a movement in either direction by an increment corresponding to the width of one of the optical emitters will result in the shutter 24 blocking an emitter of one of the two groups.

The top row of emitters consists of three emitters. The center one is disposed equidistant from the two groups of five in the lower row, and the other two in the upper row are disposed generally midway between the center one and the end of the row.

As stated previously, each emitter will have an associated detector disposed in alignment on the opposite side of the shutter. There are therefore 13 detectors mounted on printed circuit board 48 arranged the same as the emitters on printed circuit board 50.

The spacing of the emitters in the preferred embodiment is given more particularly in the following table, wherein the origin is defined as the optical axis of the rightmost emitter in the lower row (as seen in FIG. 4), and one unit of distance is defined as the distance between optical axes of adjacent emitters in the lower row.

| Pair No. (Q) | Position Row | Distance from Origin |
|---|---|---|
| 1 | lower | 0 |
| 2 | lower | 1 |
| 3 | lower | 2 |
| 4 | lower | 3 |
| 5 | lower | 4 |
| 6 | lower | 30 |
| 7 | lower | 31 |
| 8 | lower | 32 |
| 9 | lower | 33 |
| 10 | lower | 34 |
| 11 | upper | 8.5 |
| 12 | upper | 17.5 |
| 13 | upper | 26.5 |

The shutter is 25 units long, and its three teeth are each five units wide and are separated by a gap of five units.

As the shutter is moved back and forth, it will occlude different combinations of the light emitters 36. There are 66 unique combinations of shutter occlusions, representing 66 different resolvable positions of the shutter 24. Most resolvable positions are spaced from the adjacent resolvable position by one unit, although six positions represent intermediate, half-unit positions. The sixty-six possible positions range from the "cue" position P=1 (entire shutter right of Q1, all emitters uncovered) to P=60 (right edge of shutter blocking Q10, all others uncovered). It is notable that the unique arrangement shown in FIG. 4 permits resolution of positions over a range which is more than twice the length of the shutter 24. The optical position encoding arrangement is therefore relatively compact.

FIG. 5 shows the circuitry associated with each emitter/detector pair. In FIG. 5, the light emitter is shown as a light emitting diode 36 coupled across a +V supply through a current limiting resistor 62 so as to be continuously turned on. The detector element 38 is shown in FIG. 5 as an NPN phototransistor having its collector-emitter current path connected in series with a load resistor 64 across the +V supply.

Since the phototransistor 38 is mounted along the optical axis of the light emitting diode 36, the light emitting diode 36 illuminates the phototransistor 38 except when the optical path is blocked by the shutter. When illuminated, the phototransistor 38 will be in a low impedance state whereby the voltage at its collector will be low. When the shutter blocks the light path between the light emitting diode 36 and the phototransistor 38, however, the phototransistor 38 will be in a high impedance state, whereby the voltage at its collector will be close to the +V supply voltage.

A Schmitt trigger inverter 66 has its input connected to the collector of the phototransistor 38 to sense the voltage at its collector, and thereby sense whether or not the optical path between the light emitting diode 36 and the phototransistor 38 is blocked by the shutter. The inverter 66 has a very high input impedance and a low output impedance and serves as a buffer for the output of the phototransistor 38.

The output of the inverter 66 represents the output of the emitter/detector circuit 60. This output is a binary signal, having one of two levels depending upon whether or not the shutter is occluding the associated emitter. When the shutter is blocking the light path the signal at the output of the inverter 66 is at a low logic level. When the path between the emitter 36 and the detector 38 is clear, however, the signal at the output of the inverter 66 is at a high logic level. Since there are thirteen emitter/detector pairs, there will be thirteen digital signals whose values collectively identify the location of the shutter over the range of 66 possible positions.

The translation circuit 28 responds to these thirteen digital signals to provide a digital signal having a binary-coded value representative of the value assigned to the position indicated by the present state of those thirteen signals. The presently preferred form of the translation circuitry 28 is shown in FIG. 6. In FIG. 6, the translation circuit 28 is shown as consisting of an intermediate address translating circuit including five exclusive-OR gates 68–76 and a solid state read-only memory (ROM) 78. The purpose of these elements is to convert the thirteen digital signals provided by the thirteen emitter/detector pairs into an eight bit address which can be used to address a second solid state ROM 80 containing the values assigned to the various resolvable positions.

Returning, momentarily to FIG. 4, it will be recalled that the emitters located in the lower row are consolidated into two groups of five, where the two groups are separated by a distance greater than the total length of the shutter 24. Because of this, at least one of the groups of five will be totally uncovered at any given time. The outputs of the two groups may therefore be combined without loss of information. The exclusive OR gates 68–76 associated with the translation circuitry 28 shown in FIG. 6 each combine the outputs of corresponding detectors in the two groups to provide a single bit output. Thus, the output of the first detector (Q1) of the righthand group of five and the output of the first detector (Q6) of the lefthand group of five are provided to respective inputs of the exclusive OR gate 68. Similarly, the outputs of the second detectors (Q2, Q7) of each group are joined by exclusive OR gate 70, the third (Q3, Q8) by exclusive OR gate 72, etc.

If the shutter is positioned so that all the emitters in the lower row are uncovered, the outputs of Q1-Q10 will be all "1"s and the outputs of the exclusive-OR gates 68–76 will be all "0"s. If, on the other hand, the shutter is positioned to block one or more of the emitters in the lower row, the outputs of these five exclusive OR gates 68–76 will be the logic inverse of the outputs of whichever of the groups of five emitter/detector pairs is partially or wholly blocked by the shutter 24. For example, when the shutter is located in the position shown in FIG. 4, the outputs of Q1-Q5 will be "10000". The outputs of the exclusive-OR gates 68–76 will therefore be "01111". Since the outputs of the exclusive OR gates 68–76 represent the combined outputs of both groups of five emitter/detector pairs in the lower row, it is necessary to distinguish between the two possible origins of these signals, i.e., the leftward group of five or the rightward group of five. In the FIG. 6 embodiment, a read only memory (ROM) 78 is used to perform this function.

ROM 78 is a solid state memory having a number of words stored at addressable locations therein. Each three bit word may be viewed as representing a particular "coarse" position of the shutter 24. ROM 78 is addressed not only by the five outputs of one of the groups of five (in the FIG. 6 embodiment, the leftward group) but also by the outputs of the three emitter/detector pairs in the upper row (Q11-Q13). ROM 78 responds to this eight bit address by recalling and providing at its output a three bit output signal, representing the "coarse" shutter location identified by that address. The three bits provided at the output of ROM 78 and the five outputs of the exclusive OR gates 68–76 (which may be viewed as representing the "fine" position of the shutter 24) form a position-indicating byte having a unique binary value for each of the 66 resolvable positions of shutter 24.

The position-indicating byte is applied to the address inputs to a second ROM 80. ROM 80 has a plurality of addressable locations therein, each storing an eight-bit byte having a binary value assigned to the shutter location defined by the position-indicating byte addressing that location. ROM 80 responds to the position-indicating byte by providing at its output a digital signal representing the value assigned to the specific shutter location identified thereby. As in the FIG. 2 embodiment, the output of the translating circuit 28 is provided to a digital-to-analog converter 30. In FIG. 6, a filter 82 is included between the digital-to-analog converter 30 and the voltage controlled amplifier 34. Filter 82 smooths the transitions occurring in the output of converter 30.

The contents of the two solid state ROMs 78 and 80 are listed in appendix A set forth hereinafter. With the values set forth therein, the relationship between the digital signals provided at the output of the second solid state READ only memory 80 and the position of the shutter 24 is nonlinear. This relationship may be changed in any desired fashion by simply replacing the ROM 80 with another ROM having different values stored therein for the various unique positions of the shutter 24.

Position 2 represents the lowest amplifier gain setting (00). Position 1 represents a "cue" position where the input is disconnected from the VCA and instead applied to a cue amplifier 90. The switching of the input signal between amplifiers 34 and 90 is controlled by a cue decoder 92 which monitors the output of the ROM 80. The cue decoder includes logic elements arranged to recognize the unique digital word (01) associated with the cue position. The output of the cue decoder controls two solid state switching circuits 94 and 96 (although shown in FIG. 6, for convenience, as two SPST switches, they are preferably conventional solid state switches).

The state of each switch (open or closed) depends upon the logic state of the applied control signal. The output of the cue decoder 92 directly controls switch 94. The logic inverse of the cue decoder output, as provided by an inverter 98, controls switch 96. Since the logic states of the control signals applied to switches 94 and 96 are the inverse of one another, the states of the two switches are also the inverse of one another. When the slider is not in the cue position, the decoder output is at a logic "1" state, whereby switch 94 is closed and switch 96 open. The input is then applied to the voltage controlled amplifier 34. When the slider is in the cue position the decoder 92 recognizes the unique "cue" word appearing at the output of ROM 80 and provides a logic "0" at its output. This causes switch 94 to open and switch 96 to close. The applied input signal is thus removed from amplifier 34 and applied instead to cue amplifier 90. Switching of the applied signal between the voltage controlled amplifier 34 and the cue amplifier 90 is therefore accomplished electronically, that is, entirely without any mechanical switching elements.

As stated previously, the translator circuit may provide several selectable gain/position relationships. FIG. 6A is a variation of the FIG. 6 translator designed to implement this selection function. In the FIG. 6A variation, the ROM 82 is represented by two ROMs 84 and 86 connected in parallel. The ROMs 84 and 86 have different values stored in them, representing two different gain/position relationships. The operator may select one of the two ROMs, and thus one of the two relationships, via a switch 88. SPDT switch 88 has its toggle arm connected to a +V supply and its two contacts connected to the chip select (CS) inputs to the ROMs 84 and 86 such that either ROM may be selected by setting switch 88 appropriately. The ROMs 84 and 86 are of the type which essentially open circuit their outputs when not selected. This approach could easily be extended to provide the circuit with three or more selectable relationships.

As an alternative, the ROM 80 could be replaced by a random-access memory (RAM) loaded with values from some external source (e.g., a microcomputer). The gain relationship could then be easily changed by loading the RAM with a different set of values. The same circuit could thus be provided with innumerable different gain relationships.

Although the invention has been described with respect to a preferred embodiment, it will be appreciated that various rearrangements and alterations of parts may be made without departing from the spirit and scope of the present invention, as defined in the appended claims.

APPENDIX A*

| POS | ROM B ADR | DATA | ROM A ADR | DATA | POS | ROM B ADR | DATA | ROM A ADR | DATA |
|---|---|---|---|---|---|---|---|---|---|
| 1 | 00 | 01 | FF | 00 | 31 | 60 | B5 | 1F | 03 |
| 2 | 01 | 00 | FF | 00 | 32 | 61 | B7 | 1E | 03 |
| 3 | 03 | 19 | FF | 00 | 33 | 63 | BA | 1C | 03 |
| 4 | 07 | 32 | FF | 00 | 34 | 67 | BC | 18 | 03 |
| 5 | 0F | 3F | FF | 00 | 35 | 6F | BF | 10 | 03 |
| 6 | 1F | 4C | FF | 00 | 35.5 | 8F | BF | 30 | 04 |
| 7 | 1E | 54 | FF | 00 | 36 | 9F | C2 | 20 | 04 |
| 8 | 1C | 5D | FF | 00 | 37 | 9E | C4 | 21 | 04 |
| 9 | 18 | 65 | FF | 00 | 38 | 9C | C7 | 23 | 04 |
| 10 | 10 | 6D | FF | 00 | 39 | 98 | C9 | 27 | 04 |
| 10.5 | 30 | 6D | DF | 01 | 40 | 90 | CC | 2F | 04 |
| 11 | 20 | 73 | DF | 01 | 41 | 80 | CE | 3F | 04 |
| 12 | 21 | 79 | DF | 01 | 42 | 81 | D0 | 3E | 04 |
| 13 | 23 | 7F | DF | 01 | 43 | 83 | D3 | 3C | 04 |
| 14 | 27 | 84 | DF | 01 | 44 | 87 | D6 | 38 | 04 |
| 15 | 2F | 88 | DF | 01 | 44.5 | A7 | D6 | 78 | 05 |
| 16 | 3F | 8C | DF | 01 | 45 | AF | D9 | 70 | 05 |
| 17 | 3E | 8F | DF | 01 | 46 | BF | DB | 60 | 05 |
| 18 | 3C | 93 | DF | 01 | 47 | BE | DE | 61 | 05 |
| 19 | 38 | 95 | DF | 01 | 48 | BC | E0 | 63 | 05 |
| 19.5 | 58 | 95 | 9F | 02 | 49 | B8 | E3 | 67 | 05 |
| 20 | 50 | 99 | 9F | 02 | 50 | B0 | E5 | 6F | 05 |
| 21 | 40 | 9B | 9F | 02 | 51 | A0 | E8 | 7F | 05 |
| 22 | 41 | 9E | 9F | 02 | 52 | A1 | EB | 7E | 05 |
| 23 | 43 | A0 | 9F | 02 | 53 | A3 | ED | 7C | 05 |
| 24 | 47 | A3 | 9F | 02 | 53.5 | C3 | ED | FC | 06 |
| 25 | 4F | A5 | 9F | 02 | 54 | C7 | F0 | F8 | 06 |
| 26 | 5F | A8 | 9F | 02 | 55 | CF | F2 | F0 | 06 |
| 27 | 5E | AB | 9F | 02 | 56 | DF | F5 | E0 | 06 |
| 28 | 5C | AD | 9F | 02 | 57 | DE | F7 | E1 | 06 |
| 28.5 | 7C | AD | 1F | 03 | 58 | DC | FA | E3 | 06 |
| 29 | 78 | B0 | 1F | 03 | 59 | D8 | FC | E7 | 06 |
| 30 | 70 | B2 | 1F | 03 | 60 | D0 | FF | EF | 06 |

*The address and data values are listed in hexadecimal notation

What is claimed is:

1. Apparatus for determining the position of a movable member comprising:

first detector means defining a plurality of substantially parallel light paths arranged over a distance of D units and providing a first output indicative of which of said light paths are blocked;

first shutter means having alternate light obscuring and nonlight-obscuring regions, each D units in length, said first shutter means being movable through said light paths so as to affect said output of said first means and adapted to be coupled for movement with said movable member such that the position of said shutter is dependent upon the position of said movable member, and second means for determining which of said light-obscuring or nonlight-obscuring regions are interposed in said light paths and are thus affecting said first output and for providing a second output in accordance therewith, whereby said first and second outputs together represent the position of said shutter means and thus of said movable member.

2. Apparatus as set forth in claim 1, wherein said second means comprises second detector means defining a second plurality of substantially parallel light paths arranged over a distance of L units and providing a second output indicative of which of said light paths are blocked, and second shutter means having at least one light-obscuring region and movable through said second plurality of light paths so as to affect said second output, said second shutter means being coupled to said first shutter means for movement therewith so that each time said movable member is moved to a position wherein different ones of said light-obscuring and non-light-obscuring regions of said first shutter are interposed in said light paths of said first detector means said second shutter means blocks different ones of said second plurality of light paths, thereby providing a different second output.

3. Apparatus as set forth in claim 2 wherein said first and second shutter means are attached to one another to form a single shutter element having a first portion serving as said first shutter means and a second portion serving as said second shutter means.

4. Apparatus as set forth in claim 3 wherein said single shutter element has a substantially comb-like shape including a backbone representing said second portion and thus corresponding to said second shutter means and teeth projecting from said backbone representing said first portion and thus said first shutter means, said teeth serving as said light-obscuring regions and the spaces between teeth serving as said nonlight-obscuring regions.

5. Apparatus as set forth in claim 1 wherein said first shutter means is substantially N times D units in length, where N is an odd integer, and the regions at each end of said shutter are light-obscuring regions, and wherein said apparatus further comprises third detector means defining a third plurality of substantially parallel light paths arranged over a distance of D units and providing a third output indicative of which of said light paths are blocked, said third detector means being separated from said first detector means by a spacing of N times D units in the direction of travel of said first shutter means, whereby said first shutter means may be moved to a central location midway between said first and third detector means, and shutter movements of up to (N+1)D units on either side of said central location may be detected by said first and third detector means.

6. Apparatus as set forth in claim 5, wherein said second mean comprises second detector means defining a second plurality of substantially parallel light paths arranged over a distance of L units and providing a second output indicative of which of said light paths are blocked, and second shutter means having at least one light-obscuring region and movable through said second plurality of light paths so as to effect said second output, said second shutter means being couple to said first shutter means for movement therewith so that each time said movable member is moved to a position wherein different ones of said light-obscuring and non-light-obscuring regions are interposed in said light paths of said first detector means, said second shutter means blocks different ones of said second plurality of light paths, thereby providing a different second output.

7. Apparatus as set forth in claim 6, wherein said first and second shutter means comprise a single shutter having a substantially comb-like shape including a backbone serving as said second shutter means and teeth projecting from said backbone serving as said first shutter means, said teeth representing said light-obscuring regions and the spaces between teeth representing said nonlight-obscuring regions.

8. Apparatus as set forth in claim 6, wherein said second plurality of substantially parallel light paths are arranged over the space separating said first and third detector means, but offset transversely therefrom so that the backbone of said single shutter, rather than the teeth thereof, travels through said second plurality of light paths.

9. Apparatus for determining the position of a manually movable control lever, comprising:
a shutter adapted to be coupled to said movable control lever such that movement of said movable control lever causes movement of said shutter along a first path,
said shutter having two travsversely adjacent coplanar portions of similar lengths, the first portion being comprised of alternate transparent and opaque regions of equal length, the regions on either longitudinal end of said portion being opaque, and the second portion being opaque over substantially its entire length,
first and third detector means disposed adjacent said first path and separated from one another by a distance corresponding to the length of said shutter, said first and third detector means each including means for optically detecting the incremental position of any opaque region of said first shutter portion which is adjacent the respective detector means, and respectively providing first and third detector output signals in accordance with said detector position,
second detector means disposed adjacent said first path midway between said first and third detector means, including means for optically detecting the position of said second shutter portion and providing a second detector output signal in accordance therewith,
whereby said first, second, and third detector output signals define the position of said shutter along said first path and thus the position of said manually movable control lever.

10. Apparatus as set forth in claim 9, wherein each of said first, second and third detector means includes plural light sources for providing a corresponding plurality of light beams intersecting said first path and a corresponding plurality of light detector means each disposed to detect light transmitted across said path by a respective one of said light sources.

11. Apparatus as set forth in claim 10, wherein said light sources of said second detector means are disposed substantially farther apart than are the light sources of said first and third detector means.

* * * * *